Jan. 27, 1925.
A. J. HURST
PLOW
Filed April 18, 1922
1,524,516
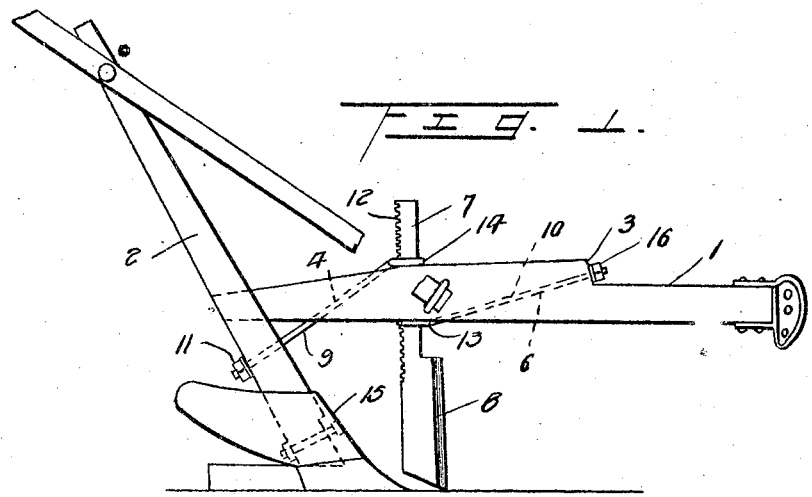
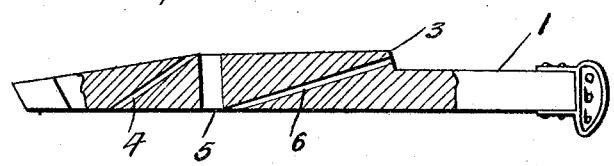
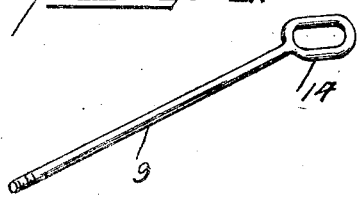 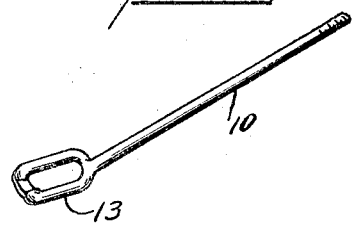
Inventor
A. J. Hurst, Patented Jan. 27, 1925.

1,524,516

UNITED STATES PATENT OFFICE.

ANDREW J. HURST, OF CLARENDON, ARKANSAS.

PLOW.

Application filed April 18, 1922. Serial No. 554,895.

*To all whom it may concern:*

Be it known that I, ANDREW J. HURST, a citizen of the United States, residing at Clarendon, in the county of Monroe and State of Arkansas, have invented certain new and useful Improvements in Plows; and I do hereby declare the following to be a full, clear, and exact description of the invention, such as will enable others skilled in the art to which it appertains to make and use the same.

This invention relates to agricultural implements and more particularly to a plow for tilling the soil in the preparation of the same for planting.

The invention relates more particularly to the colter and fastening means therefor, whereby said colter may be readily adjusted, or removed, as occasion may require.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a plow embodying the invention,

Figure 2 is a sectional detail of the plow beam,

Figure 3 is a detail view of the brace rod connecting the upper portion of the colter with the lower portion of the plow foot or standard, and Figure 4 is a detail view of the brace or connection between the plow beam and the lower portion of the colter.

Corresponding and like parts are referred to in the following description and designated in the several views of the drawings by like reference characters.

The plow beam 1 illustrated is of the ordinary wooden type and its rear end is tenoned into the plow foot or standard 2 and its forward portion is reduced to provide an abutting shoulder 3. Openings 4, 5 and 6 are formed through the beam 1, the intermediate opening 5 receiving the upper reduced portion 7 of the colter 8, the opening 4 receiving the brace rod 9 which is interposed between the upper portion of the colter 8 and the lower portion of the plow foot or standard 2, fastened in place by a nut 11, and the opening 6 receiving the brace 10 which engages the colter at a point below the beam 1 and which extends through the shouldered portion 3 of the beam to admit of the nut 16 threaded on the upper portion of the brace 10 obtaining a purchase on the shoulder 3. The rear edge of the upper reduced portion 7 of the colter is provided in its length with a plurality of notches 12 which are adapted to coact with the brace 10 to secure the colter in the required adjusted position against possible displacement. The lower rear end of the brace 10 terminates in a loop 13 through which the reduced portion 7 of the colter 8 passes. The lower rear end of the loop 13 is flattened to snugly engage the selected notch 12, whereby to form positive engagement between the brace and colter. The upper forward end of the brace rod 9 terminates in a loop 14 which receives the part 7 of the colter 8 at a point above the beam 1.

When the parts are assembled, they occupy the position substantially as indicated in Figure 1, the plow foot or standard 2 having a plow shovel 15 of any approved construction secured to the lower end thereof. The colter 8 has a loose fit in the opening 5 of the beam 1 so that when the braces 9 and 10 are loose, the colter may be adjusted vertically to the required position and is made secure by retightening the parts 9 and 10. Vertical displacement of the colter is prevented by positive engagement of the brace 10 therewith, the lower flat end of the loop 13 entering the notch 12 adjacent the under side of the beam 1. The shoulder 3 is inclined and occupies a position at a right angle to the opening 6, thereby admitting of the nut 16, threaded upon the upper end of the brace 10, fitting squarely thereagainst.

What is claimed is:

In a plow, a standard, a plow member carried thereby, a beam projecting forwardly from the standard, a colter disposed in an opening in said beam, rods passing diagonally through the beam, one of said rods also passing through the standard, a nut on the latter rod engaging the standard, said beam having a shoulder adjacent the free end of the other rod, a nut on the other rod engageable with said shoulder, said rods having loops in substantial alinement with said opening, whereby said colter will also pass through the loops and adjustment of the nuts will move the rods substantially longitudinally of the beam in opposite directions.

In testimony whereof I affix my signature in presence of two witnesses.

ANDREW J. HURST.

Witnesses:
C. J. PLUMLEE,
J. G. ROBERTS, Jr.